US008956220B2

(12) United States Patent
Melton

(10) Patent No.: US 8,956,220 B2
(45) Date of Patent: Feb. 17, 2015

(54) SYSTEM FOR PLAYING MULTIPLAYER GAMES

(75) Inventor: Lydia Catherine Melton, Douglas (IM)

(73) Assignee: Pridefield Limited, Douglas, Isle of Man (GB)

( * ) Notice: Subject to any disclaimer, the term of this patent is extended or adjusted under 35 U.S.C. 154(b) by 0 days.

(21) Appl. No.: 13/568,474

(22) Filed: Aug. 7, 2012

(65) Prior Publication Data

US 2014/0004926 A1 Jan. 2, 2014

(51) Int. Cl.
*A63F 9/24* (2006.01)
*A63F 13/00* (2014.01)
*G06F 17/00* (2006.01)
*G06F 19/00* (2011.01)

(52) U.S. Cl.
USPC .......... 463/25

(58) Field of Classification Search
USPC .......... 463/25
See application file for complete search history.

(56) References Cited

U.S. PATENT DOCUMENTS 3,810,627 A 5/1974 Levy
4,335,809 A 6/1982 Wain
4,614,342 A 9/1986 Takashima
4,636,951 A 1/1987 Harlick
4,760,527 A 7/1988 Sidley
4,926,327 A 5/1990 Sidley
5,038,022 A 8/1991 Lucero
5,083,271 A 1/1992 Thacher et al.
5,096,195 A 3/1992 Gimmon
5,159,549 A 10/1992 Hallman, Jr. et al.
5,457,305 A 10/1995 Akel et al.
5,476,259 A 12/1995 Weingardt
5,505,449 A 4/1996 Eberhardt et al.
5,559,312 A 9/1996 Lucero
5,586,257 A 12/1996 Perlman
5,613,912 A 3/1997 Slater
5,655,961 A 8/1997 Acres et al.
5,674,128 A 10/1997 Holch et al.
5,735,525 A 4/1998 McCrea, Jr.

(Continued)

FOREIGN PATENT DOCUMENTS

EP 1739639 A1 1/2007
WO 01/50391 A1 7/2001
WO 03/093921 A2 11/2003

OTHER PUBLICATIONS

International Search Report and Written Opinion of International Application No. PCT/GB2013/051703, mailed Oct. 28, 2013.

*Primary Examiner* — Milap Shah
*Assistant Examiner* — Jason Pinheiro
(74) *Attorney, Agent, or Firm* — McDonnell Boehnen Hulbert & Berghoff LLP

(57) ABSTRACT

A gaming server hosts a turn of a zero-sum game played by a plurality of players via a plurality of websites, each of the websites having a respective clearing account. The application server determines for each player a respective player value contribution based on the wagering activity of the player during the turn and a respective player value indicator associated with the player. The application server determines a total player value contribution based on the player value contributions of all of the players who played during the turn. The application server determines for each player a respective rake allocation based on the player value contribution of the player and the total player contribution. The application server credits each website's clearing account based on the respective rake allocation of each player who used the website to play the game during the turn.

22 Claims, 4 Drawing Sheets

(56) References Cited

U.S. PATENT DOCUMENTS 5,761,647 A 6/1998 Boushy
5,762,552 A 6/1998 Vuong et al.
5,768,382 A 6/1998 Schneier et al.
5,770,533 A 6/1998 Franchi
RE35,864 E 7/1998 Weingardt
5,779,549 A 7/1998 Walker et al.
5,800,268 A 9/1998 Molnick
5,800,269 A 9/1998 Holch et al.
5,809,482 A 9/1998 Strisower
5,823,879 A 10/1998 Goldberg et al.
5,833,540 A 11/1998 Miodunski et al.
5,841,980 A 11/1998 Waters et al.
5,851,149 A 12/1998 Xidos et al.
5,857,911 A 1/1999 Fioretti
5,970,143 A 10/1999 Schneier et al.
5,974,566 A 10/1999 Ault et al.
6,001,016 A 12/1999 Walker et al.
6,012,984 A 1/2000 Roseman
6,015,348 A 1/2000 Lambright et al.
6,089,982 A 7/2000 Holch et al.
6,117,011 A 9/2000 Lvov
6,165,072 A 12/2000 Davis et al.
6,183,362 B1 2/2001 Boushy
6,183,366 B1 2/2001 Goldberg et al.
6,196,920 B1 3/2001 Spaur et al.
6,224,486 B1 5/2001 Walker et al.
6,241,608 B1 6/2001 Torango
6,257,981 B1 7/2001 Acres et al.
6,264,560 B1 7/2001 Goldberg et al.
6,302,793 B1 10/2001 Fertitta, III et al.
6,352,479 B1 3/2002 Sparks, II
6,371,852 B1 4/2002 Acres
6,394,907 B1 5/2002 Rowe
6,435,968 B1 8/2002 Torango
6,532,448 B1 3/2003 Higginson et al.
6,626,757 B2 9/2003 Oliveras
6,656,040 B1 12/2003 Brosnan et al.
6,679,777 B2 1/2004 Pfeiffer et al.
6,692,353 B2 2/2004 Walker et al.
6,712,702 B2 3/2004 Goldberg et al.
6,767,284 B1 7/2004 Koza
6,837,789 B2 1/2005 Garahi et al.
6,866,586 B2 3/2005 Oberberger et al.
6,884,166 B2 4/2005 Leen et al.
6,887,151 B2 5/2005 Leen et al.
6,887,159 B2 5/2005 Leen et al.
6,893,347 B1 5/2005 Zilliacus et al.
6,899,628 B2 5/2005 Leen et al.
6,979,267 B2 12/2005 Leen et al.
7,113,975 B2 9/2006 Nakayama et al.
7,128,652 B1 10/2006 Lavoie et al.
7,186,181 B2 3/2007 Rowe
7,240,093 B1 7/2007 Danieli et al.
7,384,336 B2 6/2008 Torango
7,387,571 B2 6/2008 Walker et al.
7,419,428 B2 9/2008 Rowe
7,699,702 B2 4/2010 Daniel
7,722,466 B2 5/2010 Rothschild
8,047,913 B2 11/2011 Moshal
8,425,310 B2 * 4/2013 Soukup et al. .................. 463/25
2001/0037253 A1 11/2001 Kensey
2002/0094869 A1 7/2002 Harkham
2002/0138594 A1 9/2002 Rowe
2002/0147047 A1 10/2002 Letovsky et al.
2003/0032481 A1 2/2003 Pfeiffer et al.
2003/0069071 A1 4/2003 Britt et al.
2004/0254010 A1 12/2004 Fine
2007/0265050 A1 * 11/2007 Baazov ........................... 463/13
2010/0228619 A1 9/2010 Goldberg et al.
2013/0244769 A1 * 9/2013 Hafezi ............................ 463/26

* cited by examiner

SYSTEM FOR PLAYING MULTIPLAYER GAMES

CROSS-REFERENCE TO RELATED APPLICATION

This invention claims priority under 35 U.S.C. §119(a) to United Kingdom Pat. Application No. 1211591.1, filed Jun. 29, 2012, which application is hereby incorporated by reference.

FIELD OF THE INVENTION

This invention relates to a system for playing multiplayer games and in particular, but not exclusively, multiplayer zero-sum wager games such as multiplayer poker.

BACKGROUND

The game of poker is a multiplayer game, generally accommodating, for example, a minimum of four and a maximum of between eight and ten players. During the game players make wagers which are accumulated in a single pool ("the pot"). Once the wagering stages of the game have been completed, the players who remain in the game reveal the playing cards in their hands. The hands are ranked, and the player with the highest-ranking hand wins the pot.

The game of poker is a zero-sum game insofar as, in each turn of the game, a gain of the winner is equal to accumulated losses of the other players in the game. However, a party who arranges or hosts a game of poker may levy a commission ("a rake") on the players or on the pot in order to obtain revenue. Further examples of such multiplayer zero-sum games are backgammon, bridge, gin rummy, canasta, whist or mahjong.

A system and method for playing zero-sum games, such as poker, over a computer network is described in published PCT Application WO 03/093921 A2, published 13 Nov. 2003. The entire contents of WO 03/093921 A2 are incorporated by reference herein. The system of the '921 PCT publication includes a central gaming server accessible over the Internet and enables participation in games such as poker games by individuals accessing diverse portal websites (poker websites).

In the last several years, systems have been commercialised such as that described in the '921 patent publication wherein a gaming website provides a facility for online game playing, particularly online poker playing. Such systems have become popular and, gaming sites may host hundreds, even thousands of players at a time.

In online poker, the success of an online poker website ("virtual poker room") is directly related to the magnitude of a pool of would-be players who desire to play a game of online poker. Simply put, the larger the pool of players (i.e. the "liquidity"), the more poker games (i.e. virtual poker tables each accommodating a maximum of, say, eight players) the system can spawn, thereby increasing its attractiveness to other would-be players. In particular, a player may join in a virtual poker game at which an unoccupied playing position, or vacancy, exists. If a virtual poker game has no vacancies available, a would-be player may have to wait a considerable time before a vacant playing position becomes available, allowing the player to join the game, which may cause frustration and which may cause the would-be player to leave the gaming website. Conversely, a would-be player may also have to wait for a considerable period before a sufficient number of other would-be players become available to establish a poker game and to enable play to commence, which can also cause frustration and lead to player attrition. Increased liquidity is generally attractive to would-be players.

In order to maximise this size advantage, some online poker rooms operate under a centralised topology, in which there is a single operating entity ("operator") that owns and runs the gaming website and the player pool is homogeneous (i.e. all players are registered with, or "belong to", this single operator). The operator makes money by charging a rake on the accumulated pot in each game of poker that is played in the online poker room. Under a centralised topology, a player will always be playing only with other players who are registered with the same (i.e. the only) operator. Settlement of player wagers is straightforward: 1) the operator deducts its rake from the pot; 2) the balance of the pot is paid over to the player that has won the game; and 3) the next game starts and the process repeats.

Other online poker rooms may operate under a distributed topology (also referred to, in the art, as a network topology). Under this topology, the player pool is heterogeneous, as players registered with different, possibly competing, operators are pooled together to maximise liquidity of the collective player pool, as previously discussed. This means that players registered with different operators could find themselves playing in the same poker game. In this instance, settlement of player wagers is more complex than in the centralised topology, as situations invariably arise in which funds have to be transferred, (or "cleared") between different operators whose players are playing under a distributed topology. The principles underlying a distributed topology are set forth in the above-referenced patent application WO 03/093921 A2.

Furthermore, under a distributed topology, the rake in each game must be divided between (or "allocated to") the various operators whose players have participated in the game. At the simplest level, it is known to allocate the rake in a game as a function of the proportion of players from each operator that participated in the game. For example, suppose that four players from operator A, three players from operator B and one player from operator C participated in the game, then operator A would receive one-half of the rake for that game, operator B would receive ⅜ths of the rake and ⅛$^{th}$ of the rake would be allocated to operator C.

It is also known to allocate rake as a function of the number of players who contributed to the pot during a game. In the above example, suppose the player from operator C did not contribute to the pot (e.g. by folding immediately after being dealt a hand). In this instance, operator A would receive 4/7ths of the rake for that game, operator B would receive 3/7ths of the rake and operator C would not receive any rake at all.

It is further known to allocate rake as a function of players' proportional contribution to the pot during the game.

These prior art rake allocation methods result in operators attaching a greater value, in terms of rake generation capacity, to skilled players (referred to as "sharks") who play the game regularly, for high stakes and who play multiple games simultaneously. A lesser value is attached to lesser skilled players (referred to as "fish") who may play less frequently and do so primarily for recreation. Operators are thus rationally incentivised to direct their marketing and promotional activities to attracting sharks to their online poker rooms rather than fish. Over time, this may result in a network player ecology that is overweight with sharks relative to fish. This is undesirable as it may cause fish to lose their bankrolls more quickly than they would otherwise, resulting in a poor playing experience and consequent attrition of lesser-skilled players, thereby decreasing player liquidity.

The applicant has appreciated that enhancements are possible to the rake allocation method of the system of the '921 publication that will promote and enhance the player liquidity of the network.

The allocated rake constitutes operator revenue which the operator may utilise (i.e. "re-allocate"), in part, for marketing purposes and for player retention. For example, the operator may apply some of the allocated rake to pay affiliates to attract new players to the operator's poker room and may award some of the allocated rake to reward and retain preferred players. Such rake re-allocation is usually performed periodically, in arrears, for example once a month.

The applicant has appreciated that enhancements are possible to such prior-art rake re-allocation methods that provide operators with commercial advantages.

SUMMARY

In one aspect, a method is provided. A gaming server hosts a turn of a zero-sum game played by a plurality of players via a plurality of websites, each of the websites having a respective clearing account. An application server receives from the gaming server information regarding the turn of the game, wherein the information indicates for each player (i) the wagering activity of the player during the turn, (ii) any winnings by the player during the turn, and (iii) the website used by the player to play the game during the turn. The application server determines for each player a respective player value contribution, wherein determining a player value contribution for a player comprises determining the player value contribution based on the wagering activity of the player during the turn and a respective player value indicator associated with the player. The application server determines a total player value contribution based on the player value contributions of all of the players who played during the turn. The application server determines for each player a respective rake allocation, wherein determining a rake allocation for a player comprises determining the rake allocation based on the player value contribution of the player and the total player contribution. The application server credits each website's clearing account based on the respective rake allocation of each player who used the website to play the game during the turn.

In another aspect, a system is provided. The system comprises a gaming server and an application server in communication with the gaming server. The gaming server is configured to host a turn of a zero-sum game in which a plurality of players participate via a plurality of websites, each website having a respective clearing account. The application server is configured to determine a respective rake allocation for each player and credit each website's clearing account based on the respective rake allocation of each player who used the website to play the game during the turn. Determining a rake allocation for a player comprises (i) determining a player value contribution for the player based on wagering activity by the player during the turn and a player value indicator associated with the player and (ii) determining the player's rake allocation based on the player's player value contribution.

BRIEF DESCRIPTION OF THE DRAWINGS

Certain preferred embodiments of the invention will now be described, by way of example only, with reference to the accompanying drawings in which.

DETAILED DESCRIPTION

Embodiments will be described with particular reference to a system for playing a game of multiplayer poker in virtual poker rooms. It is to be clearly understood, however, that the scope of the invention is not limited to this particular application.

1. Overview

It is desirable to promote and enhance the player liquidity of virtual poker rooms. Having made this insight, the present disclosure provides for new methods of allocating rake in virtual poker rooms that address this problem, surpassing the ability of the prior art to do so.

Before describing the preferred embodiment in detail, an explanation will first be provided of computer-based systems for online game playing in which multiple distributed computing devices engage in playing of card games using a central server and, in particular, wager games such as poker. The following descriptions are offered by way of illustration and not limitation, of possible environments in which the invention can be practised.

Figure 1:
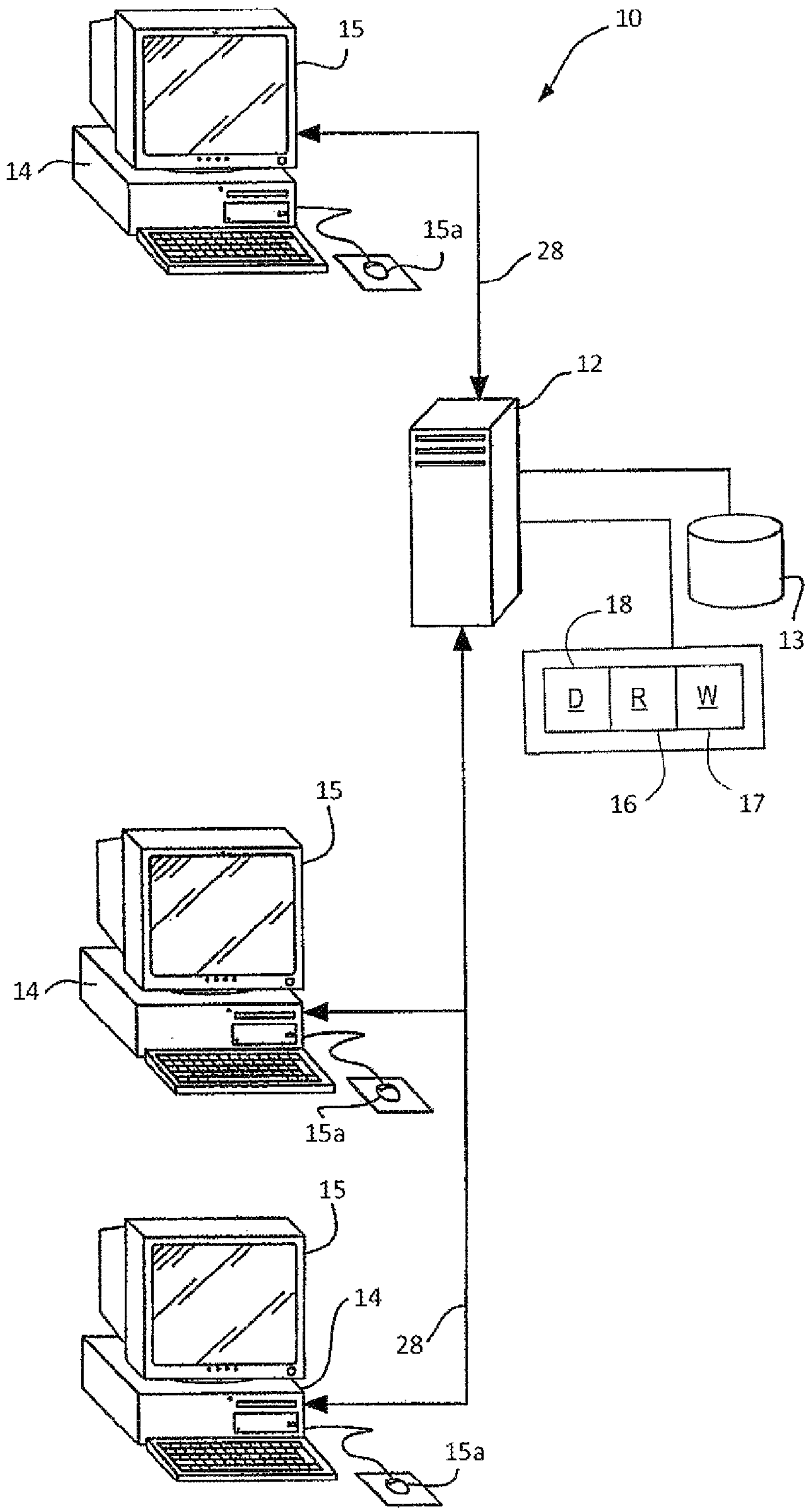
FIG. 1 is a schematic representation of a system for playing a virtual multiplayer zero-sum game.

Referring to FIG. 1, a system for playing a virtual game of multiplayer poker is indicated generally by reference numeral 10. The system 10 has a centralised topology and includes a gaming server 12 accessible to would-be players (not shown) through respective user access facilities 14 in the form of networked computing devices such as computer workstations, each having a display 15 and an associated pointing device 15*a* such as a mouse or, alternatively, a touchpad.

The game of multiplayer poker using a computing device or computer workstation 14 is facilitated by means of a workstation-stored program (not shown) referred to, for convenience, as a client process that is executable on the computer workstation 14, and a server-stored program (not shown), or server process, that is executable on the gaming server 12. The server process (not shown) generates one or more random events that affect the outcome of the game of poker, such as the dealing of cards to participating players. The client process on a computer workstation 14 of a participating player obtains the result of the random events from the gaming server 12 and displays the outcome of the game on the display monitor 15 in an intelligible manner.

The gaming server 12 includes a processing unit (such as a central processing unit, not shown) and a database 13 coupled to the processing unit that stores game information data for a plurality of instances of games playable at the computer workstations 14. The server-stored program (not shown) enables a predetermined maximum number of players, say eight, to play an instance of the game of multiplayer poker. Each instance of the game may take the form of a virtual poker table playing a particular game (e.g., Hold'em) or a virtual poker table that forms part of a tournament, such as a virtual poker tournament. When the number of players for a given instance of the game reaches this predetermined maximum number, the server-stored program initiates a further instance of the game (i.e. a new virtual poker table), the new instance of the game also being capable of accommodating a further eight players. In this manner the gaming server 12 is capable, under control of the server-stored program, of spawning as many separate instances of the multiplayer poker game as required in order to accommodate a pool of players who desire to play the game. Each instance of the game spawned in this manner is treated as totally independent of the other instances. The database 13 is updated continuously to store real-time or near real-time information as to the plurality of active game instances hosted on the gaming server 12, such as the name of each instance (e.g., a table name), the identity of players at each table, the table stakes, available seats, etc. The gaming server 12 provides this game information data to the computer workstations 14 in the form of lobby pages.

The server-stored program also provides a wagering means 17 in the form of computer instructions that enable any participating player to place wagers on a turn of the game, as well as discrimination means in the form of computer instructions 18 capable of ranking poker hands and determining a winner or winners of the turn of the game. The stored program in the gaming server 12 maintains a dynamic register 16 of all players admitted to, and participating in, any of the spawned instances of the game from time to time. The gaming server 12 also settles the wagers of the participating players in each turn of the game by debiting wagered amounts from the player accounts of losing players and crediting the amount of the pot to the accounts of winning players.

The computer workstations 14 may, for example, take the form of conventional personal computers operating under a Windows, Linux or Macintosh operating system, provisioned with a web browser and a connection to the Internet. The computer workstations 14 may also, for example, take the form of portable, hand-held computing devices with a web browser and wireless Internet access.

Figure 3:
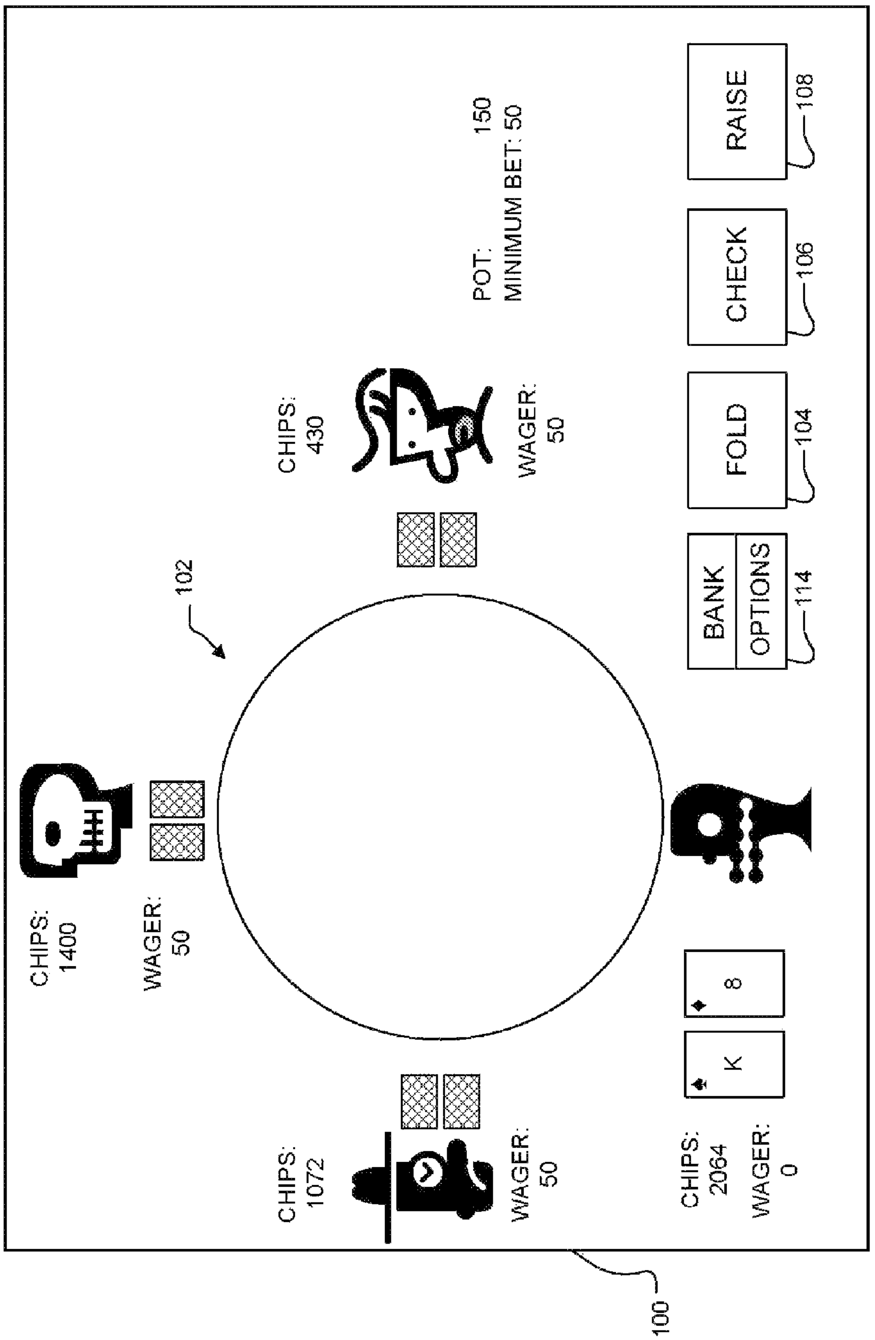
FIG. 3 is a graphical user interface associated with the system of FIG. 1 or FIG. 2.

After first registering with the gaming server 12 and establishing a player credit account, a player who desires to join the game of multiplayer poker may, by means of one of the computer workstations 14, log in to the gaming server 12 and request participation in the game. Once admitted to an instance of the game, the player may place a wager on a turn of that instance of the game. During play, each participating player is presented with an identical graphical user interface (GUI) 100 on the player's respective computer workstation 14 by the client process (not shown) in the workstation, as shown in FIG. 3. The GUI 100 presents to the player a suitable display of a poker game 102 with appropriate activatable icons 104, 106, 108 and 114 that enable the player to make his own desired game play decisions and to monitor the progress of the multiplayer game by viewing the game play decisions of the other participating players in the same instance of the game. The manner in which a participating player uses the GUI 100 to play the game of multiplayer poker is not important and will not be described here in detail.

Figure 2:
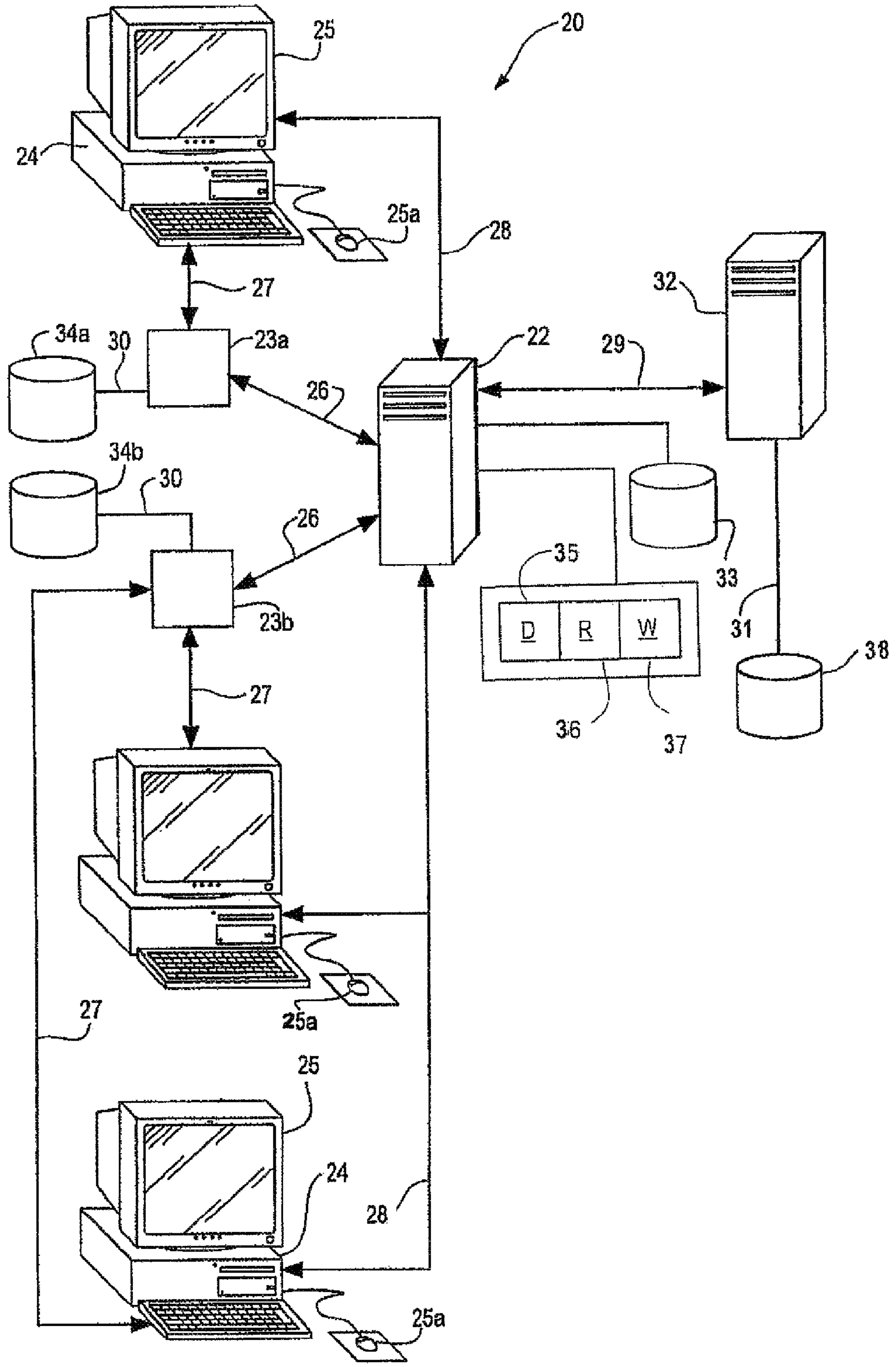
FIG. 2 is a schematic representation of an alternative system for playing a virtual multiplayer zero-sum game.

Referring now to FIG. 2, a further system for playing a virtual game of multiplayer poker is indicated generally by reference numeral 20. The system 20, which has a distributed topology, includes a central gaming server 22, and a number of portals 23*a*, 23*b* in the form of poker room websites. In the example shown, each one of the poker room websites 23*a*, 23*b* is accessible to would-be poker players (not shown) through respective user-access facilities 24 in the form of networked computing devices such as computer workstations, each having a display 25 and an associated pointing device 25*a*, for example a mouse or a touchpad. In this embodiment, poker room website 23*a* is shown as having one computing workstation 24 logically connected thereto, whereas poker room website 23*b* is shown as being logically connected to two computer workstations 24. It will be appreciated by those skilled in the art that such online poker room websites 23*a*, 23*b* can be logically connected to any desired number of such computer workstations 24 simultaneously, which number is physically limited primarily by considerations of processing power, website hardware, and network bandwidth.

The game of multiplayer poker is facilitated by means of an executable program (not shown) on each of the computer workstations 24 (a client process), and a server-stored program (not shown), or server process, that is executable on the gaming server 22. The server process (not shown) generates one or more random events that affect the outcome of the game of poker, such as dealing cards to participating players. The client process on a computer workstation 24 of a participating player obtains the result of random events from the gaming server 22 and displays the outcome of the game on the display monitor 25 in an intelligible manner.

The example gaming server 22 includes a processing unit (such as a central processing unit, not shown) and a database 33 coupled to the processing unit that stores game information data for a plurality of instances of games playable at the computer workstations 24. The server-stored program (not shown) is capable of enabling a predetermined maximum number of players, say eight, to play an instance of the game of multiplayer poker. When the number of players reaches this predetermined maximum number, the server-stored program initiates a further instance of the game, the new instance of the game also being capable of accommodating a further eight players. In this manner the gaming server 22 is capable, under control of the server-stored program, of spawning as many separate instances of the multiplayer poker game as required in order to accommodate a pool of players who desire to play the game. Each instance of the game spawned in this manner is independent of the other instances. The database 33 is updated continuously to store real-time or near real-time information as to the plurality of active game instances hosted on the gaming server 22, such as the name of each instance (e.g., a table name), the identity of players at each table, the table stakes, available seats, etc. The gaming server 22 provides the game information data to the computer workstations 24, in the form of lobby pages.

The server-stored program also provides a wagering means 37 in the form of computer instructions that enable any participating player to place wagers during a turn of the game, as well as discrimination means in the form of computer instructions 35 capable of ranking poker hands and determining a winner or winners of the turn of the game. The server-stored program also maintains a dynamic register 36 of all players admitted to, and actively participating in, any of the spawned instances of the game from time to time, together with data representative of a corresponding poker room 23*a*, 23*b* through which each player accessed the game.

In order to play multiplayer poker or other games from any computer workstation 24, the client process (not shown) may first be downloaded to that computer workstation, for example, from the gaming server 22 or from a separate download server (not shown) or from the website 23*a* or 23*b*. Such a download will typically occur when the computer workstation 24 first accesses the website 23*a* or 23*b*, when the user is presented with a message inviting the user to download the client process in order to play the game. The user selects a "Yes" icon and the download then proceeds, whereafter the client process presents the user with a GUI 100 on the computer workstation 24, and communication between the computer workstation 24 and the gaming server 22 then proceeds. As indicated in FIG. 3, the GUI 100 presents to the player a display of a poker game 102 with activatable icons 104, 106, 108 and 114 that enable the player to make game play decisions and to monitor the progress of the multiplayer poker game by observing the game play decisions of the other participants in the same instance of the game. In this distributed-topology system, a player wishing to participate in the multiplayer games, such as poker, uses a computer workstation 24 to access an online poker room 23*a*, 23*b* of the player's choice. But, regardless of the choice of website, the user is presented with the same underlying GUI 100. The GUI 100 will typically have different trademarks, colour schemes, or "look and feel" depending from which online poker room the player downloaded the client process.

The system 20 includes, further, an administration facility 32 in the form of an application server, which is communicable with the gaming server 22 by means of a communication network 29. Although the operation of the application server 32 will be outlined briefly, for further details, the reader is directed to the published '921 PCT publication cited above for further reference. The gaming server 22, the poker room web servers (not shown) corresponding to the online poker room websites 23*a*, 23*b*, the computer workstations 24 and the application server 32 communicate with each other via the Internet, represented in FIG. 2 as separate logical communication channels 26-31.

Whereas the system 10 of FIG. 1 operates within the context of a single online poker room and establishes these games with players from that poker room only, the system 20 of FIG. 2 provides a facility for pooling players from different, possibly competing online poker rooms 23*a*, 23*b*. The system of FIG. 2 solves a technical problem of inter-entity transaction settlement by means of a clearing account facility and a separate clearing account corresponding to each entity from which participating players are drawn, enabling the establishment and administration of an online multiplayer zero-sum game from a pool of would-be players drawn from several different on-line entities.

2. Rake Allocation

The application server 32 provides a clearing account facility 38 with a clearing account for each of the online poker rooms 23*a*, 23*b*. Analogously, each online poker room website 23*a*, 23*b* includes a credit account for each player who participates in the game through that poker room website. In the system of FIG. 2, therefore, website 23*a* has one player credit account associated with it, while poker room website 23*b* has two associated player credit accounts.

The application server 32 also maintains, for each player registered at each of the online poker rooms 23*a*, 23*b* a log of that player's playing history for a rolling interval of predetermined duration, for example 30 days. The playing history includes data representing the player's wagers, winnings and contributions, if any, to a bad-beat jackpot for each turn of the game played during the rolling interval.

The application server 32 updates the playing history log on a daily basis, for example at midnight, by discarding the playing history data relating to the oldest day's play and including the most recent day's playing history data. Furthermore, once the playing history log is updated, the application server 32 computes the following additional parameters for each player at online poker room 23*a*, 23*b*:

1. The player's net loss (i.e. wagers less winnings) over the interval spanned by the playing history log;
2. The player's net loss percentile ranking, derived by ranking the net loss of all players;
3. The player's break-even ratio, inclusive of rake and bad-beat jackpot contributions (a ratio of 1 indicates that the has achieved break-even over the interval spanned by the playing history log);
4. The player's break-even percentile ranking, derived by ranking the break-even ratios of all players;
5. The number of raked hands (i.e. hands from which a rake has been deducted) in which the player has participated over the interval spanned by the playing history log;
6. A player newness indicator which is greater than zero if the player has played fewer than a predetermined number of games over the interval spanned by the playing history log, or zero otherwise;
7. An overall player value indicator, which is a weighted average of the player's net loss percentile ranking, the player's break-even percentile ranking and the player's newness indicator.

The player value indicator, which is made up of three components, is a composite measure of the player's perceived benefit to the overall player pool, as follows:

a) It is recognised that losing players are necessary for the health of the player pool. If the player pool is overweight with winning players, new players may become discouraged and cease playing, causing the system to eventually implode. Hence, the more a player loses within the interval spanned by the playing history log, the more valuable that player is to the health of the player pool. The first component of the player value indicator, i.e. the player's net loss percentile ranking, is representative of the player's relative status as a losing player.

b) It is also recognised that players who break-even are likely to continue playing the game for recreation, thereby generating rake consistently. Thus, the closer a player is to achieving break-even within the interval spanned by the playing history log, the more likely that player is to be an ongoing player. The second component of the player value indicator, i.e. the player's break-even percentile ranking, is representative of the player's relative status as a break-even player.

c) A healthy player pool also requires an influx of new players in order to replace departing players and to reinvigorate the player pool. Therefore a new player, or a lapsed player returning to active play, is to be welcomed. The third and last component of the player value indicator, the player's newness indicator, is representative of how fresh (i.e. new) the player is.

The player value indicator is thus a composite measure of the desirability of a player in terms of characteristics a) to c) above.

The application server 32 allocates rake to a poker room as a function of its participating players' respective player value indicators, as will be described below.

During each turn of the game, the gaming server 22 debits the credit account of each participating player by the amounts wagered by that player. Once the turn of the game is complete, the discrimination means 35 determines the winner of the turn and the gaming server 22 credits the credit account of the winning player by the amount of the pot less an applicable rake amount. Furthermore, the gaming server 22 notifies the application server 32 of the outcome of the turn of the game and of the losses and winnings of the players that participated in the turn, together with data representative of the poker room 23*a*, 23*b* through which each player accessed the game. The manner in which individual player wagers are settled is not important to this description and will not be discussed here in detail.

Figure 4:
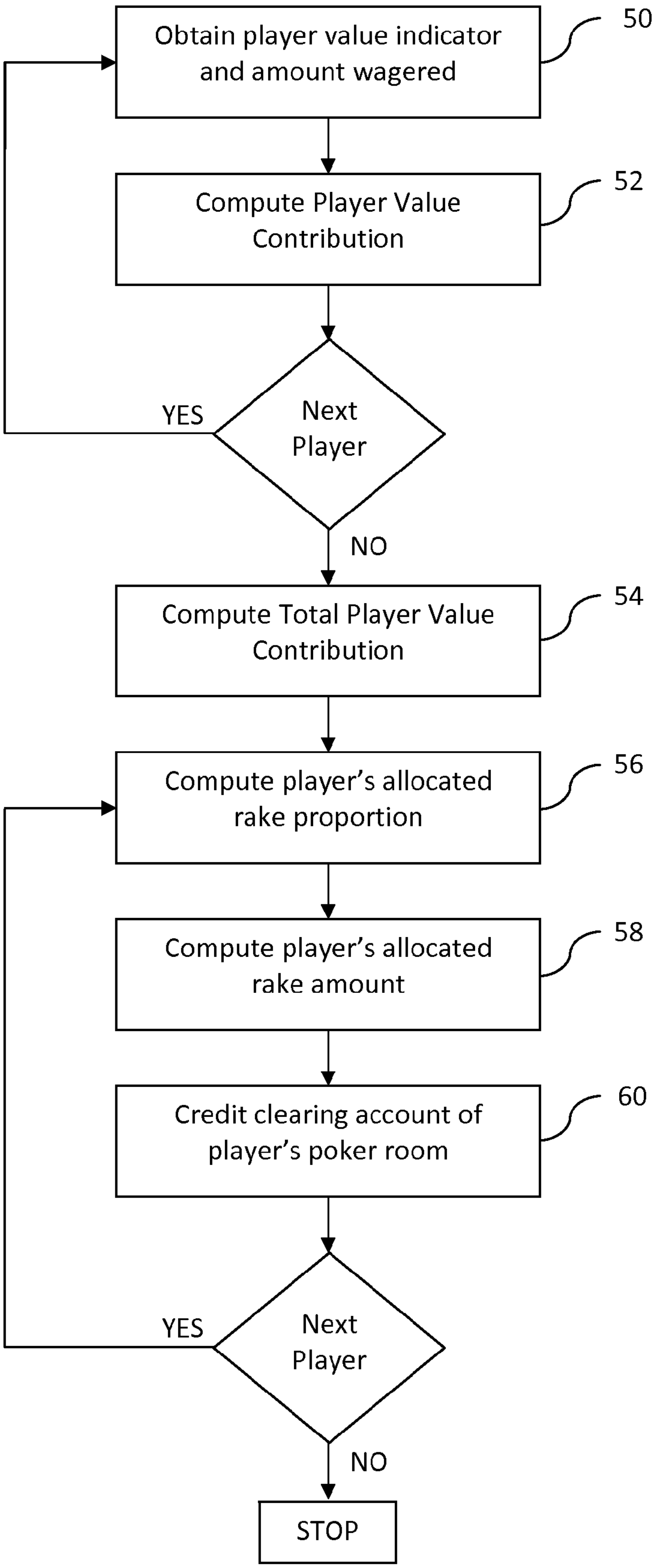
FIG. 4 is a flow diagram of the steps used in the allocation of rake in the system of FIG. 2, according to an example embodiment.

Referring to FIG. 4, the example steps involved in allocation of the rake are represented. In order to compensate the poker rooms 23*a*, 23*b* that have made their players available to the gaming server 22 to play the game, the application server 32 credits, for each participating player, a portion of the rake to the clearing account of the poker room through which the player accessed the game as follows:

i. at step 50 the application server looks up the value indicator of each participating player and the corresponding amount wagered by the player during the game;

ii. the amount wagered by each participating player during the game is multiplied, at step 52, by that player's overall player value indicator to determine a Player Value Contribution of that player;

iii. the individual Player Value Contributions are summed to obtain a Total Player Value Contribution, as indicated at step 54;

iv. for each participating player, the proportion of the rake allocated to the poker room through which the player accessed the game is obtained, at step 56, by dividing the Player Value Contribution of that player by the Total Value Player Contribution.

v. For each participating player, the rake amount allocated to the poker room of each participating player is obtained by multiplying, at step 58, the player's allocated rake proportion, as calculated at iv) above, by the rake; and vi. The allocated rake amount for each player is credited, at step 60, to the clearing account of the poker room through which that player accessed the game.

The allocation of rake by the application server is further illustrated with reference to Example 1.

EXAMPLE 1

Five players, Michael, Paul, Sarah, John and Mary play a hand of Texas Hold'em poker.

Michael and John accessed the game through Bob's Poker Room, Paul through Green Poker Room and Sarah and Mary though 30 Games Poker Room. At the time of playing the hand the players have the following player value indicators:

| Player | Poker Room | Player Value Indicator |
|---|---|---|
| Michael | Bob's Poker | 0.9 |
| Paul | Green Poker | 0.15 |
| Sarah | 30 Games Poker | 0.4 |
| John | Bob's Poker | 0.5 |
| Mary | 30 Games Poker | 0.8 |

The players play the hand, which has following outcome:

| Player | Wagers | Winnings |
|---|---|---|
| Michael | $35 | |
| Paul | $ 5 | |
| Sarah | $65 | $112 |
| John | $ 0 | |
| Mary | $10 | |

The rake for the hand is $3.

The hand is played as follows: John folded without placing a bet. Paul and Mary folded during the hand. Michael and Sarah were the last two players left in the game, with bets of $35 each. Sarah then raised by $30 and Michael folded at that point. The pot was $115 and Sarah won $112 after deduction of the $3 rake.

Player Value Contribution=Player Value*Player Wager, as follows:

| Player | Player Value | Wager | Player Value Contribution |
|---|---|---|---|
| Michael | 0.9 | $35 | 31.5 |
| Paul | 0.15 | $ 5 | 0.75 |
| Sarah | 0.4 | $65 | 26 |
| John | 0.5 | $ 0 | 0 |
| Mary | 0.8 | $10 | 8.0 |
| | | Total PVC | 66.25 |

Allocated Rake =Rake*Player Value Contribution/Total Player Value Contribution i.e.

| Player | Rake | Player Value Contribution | Total PV Contribution | Allocated Rake |
|---|---|---|---|---|
| Michael | $3 | 31.5 | 66.25 | $1.4264 |
| Paul | $3 | 0.75 | 66.25 | $0.0340 |
| Sarah | $3 | 26 | 66.25 | $1.1774 |
| John | $3 | 0 | 66.25 | $0 |
| Mary | $3 | 8.0 | 66.25 | $0.3623 |

The rake allocation to the three poker rooms is thus:

| Poker Room | Allocated Rake |
|---|---|
| Bob's Poker | $1.4264 |
| Green Poker | $0.0340 |
| 30 Games Poker | $1.5397 |

The rake allocation methodology described above may also be used to determine affiliate remuneration and player rewards (i.e. rake-based promotions such as rake-back and player bonuses).

In this embodiment the application server 32 applies a secondary rake allocation method in parallel with the rake allocation method described above (defined here, for convenience, as the "primary rake allocation method"). Whereas the primary rake allocation method determines the rake amounts that are to be credited to the clearing accounts of the poker rooms of players that participated in the game, the secondary rake allocation method determines notional rake amounts to be allocated to players themselves as a function of their playing history during the interval spanned by the playing history log. The notional rake accrued by a player in this manner can be used by a poker room as a basis to determine player rewards, such as rake-back and/or bonuses bestowed by the poker room on its players.

The secondary rake allocation rake allocation method may apply a different rake allocation metric to that of the player value metric described above in relation to the allocation of rake to the players' various poker rooms. It will be appreciated that the secondary rake allocation method permits an operator to perform rake reconciliation for player rewards in real-time, as opposed to periodic, manual reconciliations in arrears, as is the case in the prior art.

Additionally, the application server 32 may also apply a tertiary rake allocation method in parallel with the primary and secondary rake allocation methods. The tertiary rake allocation method can determine notional rake amounts to be allocated to affiliates through whom participating players registered with their respective poker rooms, as a function of the players' respective playing histories during the interval spanned by the playing history log. The notional rake accrued by an affiliate in this manner can be used by a poker room as a basis to determine affiliate remuneration.

Numerous modifications are possible to this embodiment without departing from the scope of the disclosure. For example, the interval spanned by the playing history log may be greater than 30 days, for example 60, 90 days, or even longer. Further, the application server may apply different rules in allocating rake, as illustrated with reference to Example 2.

EXAMPLE 2

In this example, the rake allocation is determined as a function of the player's Called Wagers, as opposed to the player's total wagers as in Example 1. The Called Wager is that portion of a player's wagers that has been called by another player.

Five players, Michael, Paul, Sarah, John and Mary play a hand of Texas Hold'em poker. Michael and John accessed the game through Bob's Poker Room, Paul through Green Poker Room and Sarah and Mary though 30 Games Poker Room. At the time of playing the hand the players have the following player value indicators:

| Player | Poker Room | Player Value Indicator |
|---|---|---|
| Michael | Bob's Poker | 0.9 |
| Paul | Green Poker | 0.15 |
| Sarah | 30 Games Poker | 0.4 |
| John | Bob's Poker | 0.5 |
| Mary | 30 Games Poker | 0.8 |

The players play the hand, which has following outcome:

| Player | Wagers | Winnings | Called Wager |
|---|---|---|---|
| Michael | $35 | | $35 |
| Paul | $ 5 | | $ 5 |
| Sarah | $65 | $112 | $35 |
| John | $ 0 | | $ 0 |
| Mary | $10 | | $10 |

The rake for the hand is $3.

The hand is played as follows: John folded without placing a bet. Paul and Mary folded during the hand. Michael and Sarah were the last two players left in the game, with bets of $35 each. Sarah then raised by $30 and Michael folded at that point. The pot was $115 and Sarah won $112 after deduction of the $3 rake.

In Sarah's case, her Called Wager is $35 as her final raise of $30 was not called.

Player Value Contribution=Player Value*Player Wager, as follows:

| Player | Player Value | Wager | Player Value Contribution |
|---|---|---|---|
| Michael | 0.9 | $35 | 31.5 |
| Paul | 0.15 | $ 5 | 0.75 |
| Sarah | 0.4 | $35 | 14 |
| John | 0.5 | $ 0 | 0 |
| Mary | 0.8 | $10 | 8.0 |
| | | Total PVC | 54.25 |

Allocated Rake=Rake*Player Value Contribution/Total Player Value Contribution i.e.

| Player | Rake | Player Value Contribution | Total PV Contribution | Allocated Rake |
|---|---|---|---|---|
| Michael | $3 | 31.5 | 54.25 | $1.7419 |
| Paul | $3 | 0.75 | 54.25 | $0.0415 |
| Sarah | $3 | 14 | 54.25 | $0.7742 |
| John | $3 | 0 | 54.25 | $0 |
| Mary | $3 | 8.0 | 54.25 | $0.4424 |

The rake allocation to the three poker rooms is thus:

| Poker Room | Allocated Rake |
|---|---|
| Bob's Poker | $1.7419 |
| Green Poker | $0.0415 |
| 30 Games Poker | $1.2166 |

The system 10 therefore permits the use of rake allocation to shape the composition of the pool of poker players through the use of an appropriate primary rake allocation metric to allocate rake to the operators of the various poker rooms from which the players are drawn. Furthermore, one or more separate metrics can be applied in parallel with the primary rake allocation metric to allocate notional rake amounts to players and affiliates that can be used to determine player rewards and affiliate remuneration.

It is a feature of the system that the rake allocation metric can be altered at any time, independently of the separate player reward and affiliate remuneration metrics. This means that players and affiliates will not be affected by any change in rake allocation that is implemented in order to change the composition of the player pool.

What is claimed is:

1. A method, comprising:

a gaming server hosting a turn of a zero-sum game played by a plurality of players via a plurality of websites, each of the websites having a respective clearing account;

an application server receiving from the gaming server information regarding the turn of the game, wherein the information indicates for each player (i) the wagering activity of the player during the turn, (ii) any winnings by the player during the turn, and (iii) the website used by the player to play the game during the turn;

the application server determining for each player a respective player value contribution, wherein determining a player value contribution for a player comprises multiplying a called amount that is based on the wagering activity of the player during the turn by a respective player value indicator associated with the player;

the application server determining a total player value contribution based on the player value contributions of all of the players who played during the turn;

the application server determining for each player a respective rake allocation, wherein determining a rake allocation for a player comprises determining the rake allocation based on the player value contribution of the player and the total player contribution; and the application server crediting each website's clearing account based on the respective rake allocation of each player who used the website to play the game during the turn.

2. The method of claim 1, further comprising:
the application server maintaining a playing history log, wherein the playing history log includes data representative of wagers and winnings of players who used any of the plurality of websites to play the zero-sum game during a predetermined time interval.

3. The method of claim 2, wherein the application determines net loss percentile rankings, break-even percentile rankings, and newness indicators for players based on the data in the playing history log.

4. The method of claim 2, further comprising:
the application server determining a secondary rake allocation for a player based on data in the playing history log relating to the player's playing history during the predetermined time interval.

5. The method of claim 4, further comprising:
determining a player reward for the player based on the player's secondary rake allocation.

6. The method of claim 2, further comprising:
the application server determining a tertiary rake allocation for an entity based on data in the playing history log relating to use of one or more websites affiliated with the entity during the predetermined time period.

7. The method of claim 6, further comprising:
determining a remuneration of the entity based on the entity's tertiary rake allocation.

8. The method of claim 1, further comprising:
the application server determining the respective player value indicator of each player, wherein a player value indicator for a player is determined based on a net loss percentile ranking for the player, a break-even percentile ranking for the player, and a newness indicator for the player.

9. The method of claim 8, wherein a player value indicator for a player is calculated as a weighted average of the player's net loss percentile ranking, the player's break-even percentile ranking, and the player's newness indicator.

10. The method of claim 1, wherein determining the called amount comprises determining an amount that was wagered by the player and called by another player during the turn.

11. The method of claim 1, wherein the application server determines the total player value contribution as a sum of the player value contributions of all of the players who played during the turn.

12. The method of claim 1, further comprising:
the application server determining a rake associated with the turn.

13. The method of claim 10, wherein determining a rake allocation for a player further comprises (i) determining a ratio of the player's player value contribution to the total player contribution and (ii) obtaining the rake allocation for the player by multiplying the rake by the ratio.

14. A system, comprising:
a gaming server, wherein the gaming server is configured to host a turn of a zero-sum game in which a plurality of players participate via a plurality of websites, each website having a respective clearing account; and
an application server in communication with the gaming server, wherein the application server is configured to determine a respective rake allocation for each player and credit each website's clearing account based on the respective rake allocation of each player who used the website to play the game during the turn, wherein determining a rake allocation for a player comprises (i) determining a player value contribution for the player based on a product of a called amount that is based on wagering activity by the player during the turn by a player value indicator associated with the player and (ii) determining the player's rake allocation based on the player's player value contribution.

15. The system of claim 14, wherein the called amount comprises an amount that was wagered by the player and called by another player during the turn.

16. The system of claim 14, wherein the application server is further configured to determine a total player value contribution based on the player value contributions of all of the players who played during the turn.

17. The system of claim 16, wherein determining the player's rake allocation based on the player's player value contribution comprises (i) determining a ratio of the player's player value contribution to the total player value contribution and (ii) obtaining the player's rake allocation by multiplying a rake associated with the turn by the ratio.

18. The system of claim 14, wherein the application server is further configured to determine a player value indicator for a player based on a net loss percentile ranking for the player, a break-even percentile ranking for the player, and a newness indicator for the player.

19. The system of claim 14, wherein the application server is further configured to determine a rake associated with the turn of the game.

20. The system of claim 14, wherein the application server is further configured to maintain a playing history log, wherein the playing history log includes data representative of wagers and winnings of players who used any of the plurality of websites to play the zero-sum game during a predetermined time interval.

21. The system of claim 20, wherein the application server is further configured to determine a secondary rake allocation for a player based on data in the playing history log relating to the player's playing history during the predetermined time interval.

22. The system of claim 21, wherein the application server is further configured to determine a tertiary rake allocation for an entity based on data in the playing history log relating to use of one or more websites affiliated with the entity during the predetermined time interval.

* * * * *